United States Patent [19]

Malanga

[11] Patent Number: 4,748,222
[45] Date of Patent: May 31, 1988

[54] PREPARATION OF HIGHLY PURE ALPHA-METHYLSTYRENE POLYMER

[75] Inventor: Michael T. Malanga, Midland, Mich.

[73] Assignee: The Dow Chemical Company, Midland, Mich.

[21] Appl. No.: 846,539

[22] Filed: Mar. 31, 1986

[51] Int. Cl.⁴ .............................. C08F 2/06; C08F 4/48
[52] U.S. Cl. ..................................... 526/174; 526/173; 526/346; 526/347
[58] Field of Search ...................... 526/174, 347, 347.1, 526/173, 346

[56] References Cited

U.S. PATENT DOCUMENTS

| | | | |
|---|---|---|---|
| 4,075,404 | 2/1978 | Douglas | 526/347 |
| 4,195,144 | 3/1980 | Mertwoy | 526/347 |
| 4,252,925 | 2/1981 | Fukuda | 526/174 |
| 4,415,695 | 11/1983 | Sarkar | 528/490 X |
| 4,525,560 | 6/1985 | Smith | 526/201 |

Primary Examiner—Joseph L. Schofer
Assistant Examiner—F. M. Teskin

[57] ABSTRACT

An improved process for the anionic polymerization of alpha-methylstyrene polymers employs an organolithium initiator and a sodium-, potassium-, rubidium- or cesium initiator activator compound.

10 Claims, 1 Drawing Sheet

PREPARATION OF HIGHLY PURE ALPHA-METHYLSTYRENE POLYMER

BACKGROUND OF THE INVENTION

The present invention relates to a process for preparing polymers of alpha-methylstyrene. More particularly, the present invention relates to an improved process allowing for the preparation of highly pure polymers comprising in polymerized form alpha-methylstyrene and a copolymerizable vinyl aromatic comonomer.

It is previously known in the art that polymers of alpha-methylstyrene may be readily prepared by anionic polymerization. A suitable process for preparing such polymers is disclosed, for example, in EP No. 87,165.

Polymers of alpha-methylstyrene and, in particular, copolymers of alpha-methylstyrene and copolymerizable vinyl aromatic comonomers, especially styrene, are highly desirable due to their relatively high glass transition temperatures and ease of fabrication. In certain end use applications such as in glazing, optical devices, and light transmission devices such as fiber optical cables, it is additionally desirable that the polymers exhibit good clarity and an absence of color.

Presently available anionic polymerization initiators such as the well known organo lithiums, have not allowed the attainment of highly pure alpha-methylstyrene polymers. In practice, relatively large amounts of such organolithium initiators, i.e. on the order of 500 parts per million based on polymer weight or greater are generally employed. In applications requiring improved clarity and reduced color in the resulting alpha-methylstyrene polymer, the use of these elevated amounts of organolithium initiator have been found to be unsatisfactory due to the level of lithium salts remaining in the finished polymer. Polymers for optical usages may be quantitatively evaluated for purity by measuring color, especially the yellowness thereof, according to published techniques, such as American Society of Testing Method Test ASTM-D1925. It has not previously been known to prepare polymers of alpha-methylstyrene having a yellowness index of 4.0 or less measured by the above ASTM-D1925 procedure.

In U.S. Pat. No. 3,356,754, it is disclosed that homopolymers of conjugated dienes or copolymers thereof with another conjugated diene or a vinyl substituted aromatic hydrocarbon may be prepared employing an initiator comprising an organolithium compound and a sodium, potassium, rubidium or cesium salt of an organo compound. The reference specifically excluded the preparation of alpha-methylstyrene copolymers. At Column 5, line 35, it was stated "it is to be understood that a compound having a substituent on the alpha-carbon atoms, such as alpha-methylstyrene, is not applicable to the practice of the instant invention."

In U.S. Pat. No. 4,246,372, later researchers reiterated this finding. In this patent, it was disclosed that block copolymers of alpha-methylstyrene and butadiene could not successfully be prepared in the presence of alkyllithium initiators and initiation activators such as potassium, rubidium or cesium alkoxides. Suitable polymers could be prepared only by conducting polymerization at reduced temperatures on the order of about 30° C. and subsequently capping the prepared polymer with polybutadiene. At elevated temperatures only random copolymers of alpha-methylstyrene and butadiene could be prepared.

It would be desirable to provide an improved process for the anionic polymerization of alpha-methylstyrene.

It would be further desirable to provide a process for the anionic polymerization of alpha-methylstyrene at elevated temperatures that does not require the presence of a conjugated diene to provide capping of the living polymer.

It would be desirable to provide an anionic polymerization process for the preparation of copolymers of alpha-methylstyrene and a copolymerizable vinyl aromatic comonomer employing reduced levels of organo lithium initiator in order to provide copolymers thereof having excellent purity, clarity and color.

SUMMARY OF THE INVENTION

Figure 1:
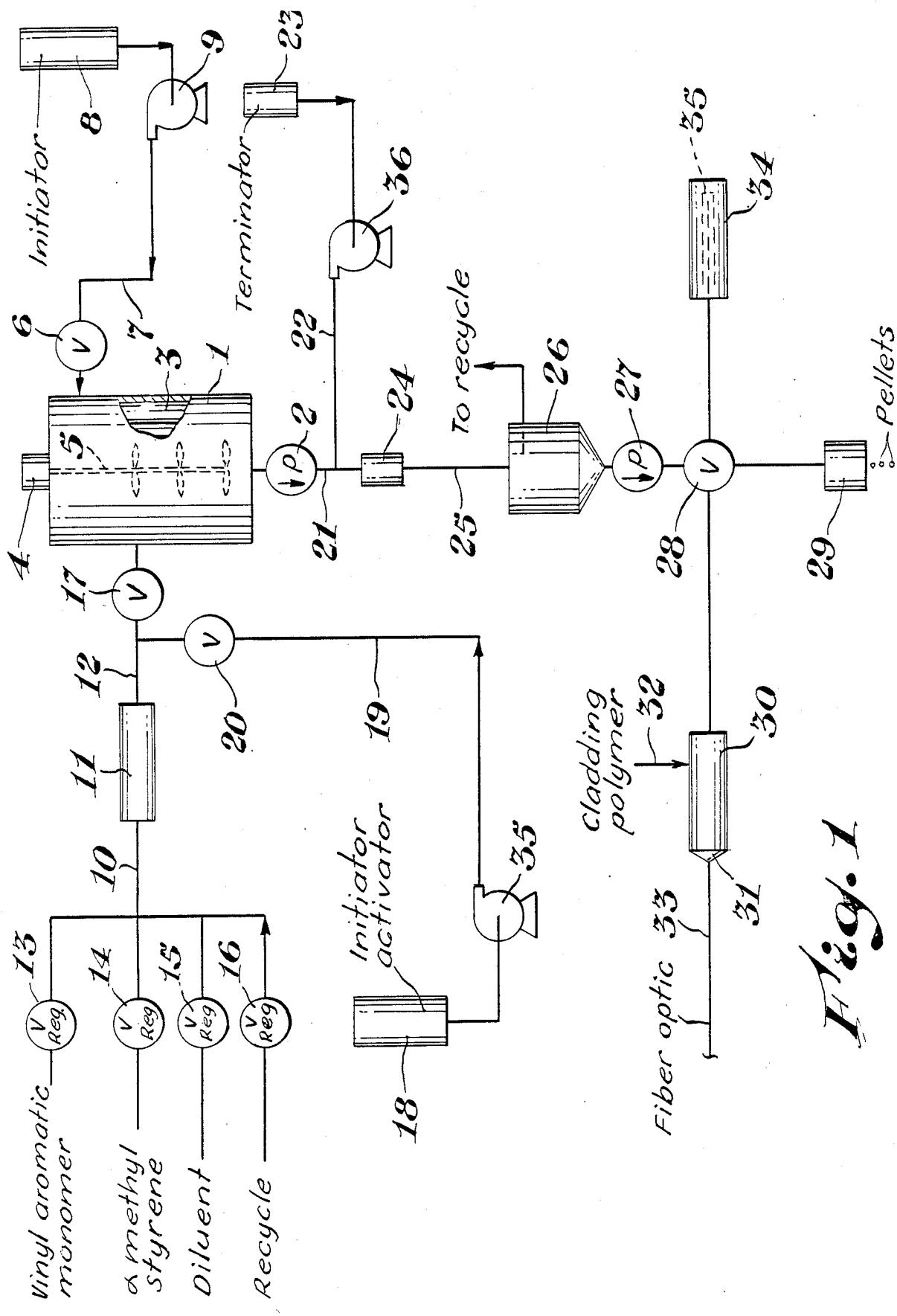
FIG. 1 illustrates an apparatus adapted for the continuous preparation of coextruded fibers or cast preforms comprising highly pure alpha-methylstyrene polymer.

According to the present invention a monomer mixture consisting essentially of alpha-methylstyrene and at least one copolymerizable vinyl aromatic comonomer is polymerized by contacting the mixture with an effective amount to cause anionic polymerization of an organolithium initiator and a sodium, potassium, rubidium or cesium initiator activator, optionally in the presence of an organic diluent at a temperature above about 61° C. and recovering the alpha-methylstyrene polymer.

The process of the invention is conducted in the substantial absence of a conjugated diene such as butadiene. Advantageously, very small amounts of initiator and initiator activator may be employed in the process thereby resulting in the preparation of alpha-methylstyrene polymers having excellant clarity and little coloration. By this technique, polymers having a yellowness index as measured by ASTM-D1925 of 4.0 or less, or even 3.0 or less may be prepared.

DETAILED DESCRIPTION OF THE INVENTION

As in any anionic polymerization, initiator, diluent and monomer purity are highly critical to successful polymerization. Suitable techniques for the purification of monomers, initiators and diluents include distillation; contacting the materials with a purifying agent such as a molecular sieve, an ion exchange resin or an alumina bed; or a combination of such techniques.

Vinyl aromatic comonomers for use according to the present invention correspond to the formula:

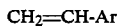

wherein Ar is an aromatic, radical, optionally substituted with alkyl groups. Preferred, due to their wide availability, are such compounds having from 8 to about 18 carbons. Illustrative examples include styrene, para-methylstyrene, tertiary butylstyrene, phenylstyrene, 1-vinylnaphthalene, etc. A preferred vinyl aromatic comonomer is styrene.

Organolithium compounds employed as initiators in the present invention are well known in the art. Suitable compounds correspond to the formula

wherein R is a hydrocarbon radical selected from the group consisting of aliphatic, cycloaliphatic, and aromatic radicals and x is an integer from 1 to 4 inclusive. The R in the formula preferably contains from 1 to 20 carbon atoms, although it is within the scope of the invention to use higher molecular weight compounds. Examples of suitable organolithium compounds which can be used include methyllithium, isopropyllithium, n-butyllithium, secondary butyllithium, tertiary butyllithium, tertiary octyllithium, phenyllithium, naphthyllithium, 1,4-dilithiocyclohexane, 1,3,5-trilithiopentane, etc. A preferred class of organolithium initiators are the alkyllithiums having up to about 20 carbons. An especially preferred initiator is n-butyllithium.

Initiation activators employed according to the present invention include sodium, potassium, rubidium or cesium derivatives of oxygen, sulfur or nitrogen containing organic compounds. These compounds are preferably selected from the group consisting of compounds having the following formulas:

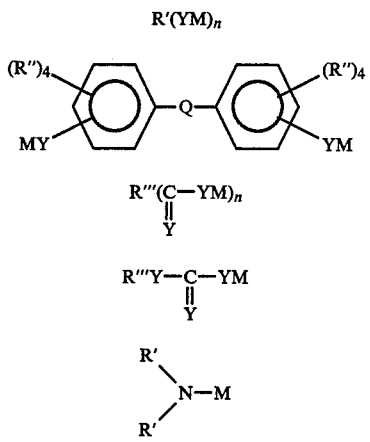

wherein R' is selected from the group consisting of aliphatic, cycloaliphatic and aromatic radicals, preferably containing from 1 to 20 carbon atoms, M is selected from the group consising of sodium, potassium, rubidium and cesium, R'' is selected from the group consisting of hydrogen and aliphatic, cycloaliphatic and aromatic radicals, preferably containing from 1 to 6 carbon atoms, Q is selected from the group consisting of a covalent bond,

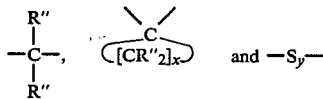

where R'' is as defined before, x is an integer from 4 to 5, inclusive, and y is an integer from 1 to 3, inclusive, R''' is selected from the group consisting of aliphatic, cycloaliphatic and aromatic radicals, preferably containing from 4 to 20 carbon atoms, Y is selected from the group consisting of oxygen and sulfur and n is an integer from 1 to 3, inclusive. It is to be understood that the aliphatic and cycloaliphatic radicals mentioned above can be saturated or unsaturated.

Formulas 1 and 2 define the alkali metal salts of mono- and polyhydric alcohols, mono- and polyhydric phenols, including bis-phenols, and sulfur analogs of the foregoing, that can be used in preparing the present catalyst system. Specific examples of compounds represented by Formula 1 include the sodium, potassium, rubidium and cesium salts of methyl alcohol, ethyl alcohol, n-propyl alcohol, isopropyl alcohol, tert-butyl alcohol, tert-amyl alcohol, n-hexyl alcohol, cyclohexyl alcohol, eicosyl alcohol, 2-butenyl alcohol, 4-methylcyclohexyl alcohol, 4-hexenyl alcohol, 2,5-decadienyl alcohol, 3-cyclopentenyl alcohol, 4,6-di-n-butyldecyl alcohol, 4,8-dodecadienyl alcohol, allyl alcohol, 1,3-dihydroxyhexane, 1,5,9-trihydroxytridecane, 1,6-dihydroxyoctane, 1,2,15-trihydroxypentadecane, benzyl alcohol, 3(4-tolyl)-propyl alcohol, phenol, catechol, resorcinol, hydroquinone, pyrogallol, 1-naphthol, 2-naphthol, 2,6-di-tert-butyl-4-methylphenol (Ionol), 2,4,6-tri-tert-butylphenol, 2,6-di-tert-butyl-4-phenylphenol, 2,6-di-sec-butyl-4-methylphenol, ethanethiol, 2-butanethiol, 2-pentanethiol, 2-isobutanethiol, benzenethiol, (thiophenol), 1,12-dodecanedithiol, 5,9-di-n-propyl-1,14-tetradecanedithiol, 2-naphthalenethiol, cyclohexanethiol, 2,5-di-n-hexyl-6-tert-butylbenzenethiol, 2,6-ditert-butyl-4(4-tolyl)benzenethiol, 3-methylcyclohexanethiol, 2-naphthalenethiol, benzenemethanethiol, 2-naphthalenemethanethiol, 1,8-octanedithiol, 1,10-decanedithiol, 1,4-benzenedithiol, and the like. Specific examples of suitable compounds corresponding to Formula 2 are the sodium, potassium, rubidium and cesium salts of 2,2'-methylene-bis(4-methyl-6-tert-butylphenol), 2,2'-isopropylidene-bis(6-cyclohexylphenol), 2,2'-isopropylidene-bis(6-cyclohexyl-p-cresol), 4,4'-isopropylidene-bis(2,6-dicyclohexylphenol), 4,4'methylene-bis(2,6-diisopropylphenol), 2'2'-methylene-bis(6-benzyl-p-cresol), 2,2'-ethylidene-bis(5-isopropylphenol), 1,1-bis(4-hydroxyphenyl)cyclohexane, 1,1-bis[2-hydroxy-3-(3-tolyl)]cyclopentane, 2,2'-ethylidene-bis(4-ethyl-6-tert-hexylthiophenol), 2,2'-propylidene-bis(3,5-di-methyl-6-cyclopentylthiophenol), 4,4'-thio-bis(2,6-di-tert-butylphenol), 4,4'-dithio-bis(2-n-propyl-6-tert-butylphenol), 4,4'-trithio-bis(2-methyl-6-isopropylphenol), and the like.

Specific examples of the alkali metal salts of mono- and polycarboxy acids and sulfur analogs as represented by Formula 3 include the sodium, potassium, rubidium and cesium salts of isovaleric acid, caprylic acid, lauric acid, muristic acid, palmitic acid, stearic acid, arachidic acid, oleic acid, ricinoleic acid, linolenic acid, linolenic acid, gadoleic acid, cyclopentanecarboxylic acid, dimethylcyclohexane-3,5-dicarboxylic acid, phenylacetic acid, benzoic acid, pimelic acid, azelaic acid, sebacic acid, phthalic acid, henedecane-1,11-dioic acid, 1,8,16-hexadecanetricarboxylic acid, 3,3,7,7-tetramethylnonane-1,5,9-tricarboxylic acid, 4-pentyl-2,5-heptadiene-1,7-dioic acid, 2-naphthoic acid, 1-naphthyleneacrylic acid, hexanethionic acid, 2,2-diethylbutanethiolic acid, decanethionic acid, tridecanethionothiolic acid, 4-tetradecanethionic acid, thiolbenzoic acid, thiono-1-naphthoic acid, and the like.

Specific examples of alkali metal carbonates and sulfur analogs as represented by Formula 4 include the sodium, potassium, rubidium and cesium salts of tert-butylcarbonic acid, n-hexylcarbonic acid, 3,5-dimethylhexylcarbonic acid, n-dodecylcarbonic acid, 4,4-diethylhexylcarbonic acid, 3,6-diphenyloctylcarbonic acid, 7-didecenylcarbonic acid, 3-cyclohexenylcarbonic acid, phenylcarbonic acid, O-tert-amyl ester of thiolcarbonic acid, O-tridecyl ester of thiononcarbonic acid, O-eicosyl ester of thionothiocarbonic acid (xanthic acid), S-hexadecyl ester of dithiolcarbonic acid, S-(3- cyclohexenyl) ester of thiolcarbonic acid, phenyl ester of trithiocarbonic acid, and the like.

Specific examples of alkali metal salts of secondary amines as represented by Formula 5 include the sodium, potassium, rubidium and cesium salts of dimethylamine, di-n-butylamine, methyl-n-hexylamine, di(3,5-diethyloctyl)amine, di(8-phenyloctyl)amine, di(3-hexenyl)amine, diphenylamine, dibenzylamine, ethyl-4-tolylamine, n-propyl-n-eicosylamine, and the like.

Preferred initiator activators are sodium, potassium, rubidium or cesium alcoholates. Especially preferred are organic liquid soluble, potassium alcoholates, especially potassium tertiary-amyloxide.

Without wishing to be bound to any theory of operation, it is believed that the initiator activators employed in the present invention operate by improving the efficiency of converting the organolithium initiator from an initial inactive hexacoordinate complex to an active monomeric species. In theory, one initiator activator molecule is effective to provide six active lithium compounds from each lithium complex. Because the polymerization is normally operated in a monomer starved mode by regulating vinyl aromatic monomer supply to control reaction exotherm, the gross rate of polymer formation is not increased in the process. However, the present polymerization process is achieved through the use of greatly reduced amounts of organolithium initiator. Accordingly, the apparant rate of polymerization per weight of initiator is increased.

Additional activators previously known in the art may also be used according to the present invention. A suitable class of such compounds include the organic ethers such as tetrahydrofuran, and cyclic ethers, such as the well known crown ethers. Generally, however, the use of such organic activating agents is not preferred.

The organolithium initiator and sodium, potassium, rubidium or cesium initiator activator are employed in relative amounts sufficient to cause initiation of the anionic polymerization. The relative ratios of lithium initiator to initiator activator may be from about 1/10 to about 1,000/1 on a molar basis. Preferably, the organolithium initiator is used in large excess, i.e. in a ratio from about 1/1 to about 100/1, compared to the initiator activator. Especially preferred is a ratio of about 5/1 to about 10/1.

Due to the presence of the initiator activator the amount of organo lithium initiator employed to cause anionic polymerization may be substantially reduced. Suitable levels of organolithium initiator based on final polymer weight are from about 0.1 part per million (ppm) to about 1,000 ppm, preferably from about 1 ppm to about 100 ppm, and most preferably from about 1 ppm to about 50 ppm. Preferred levels of initiator activator compound based on final polymer weight are from about 0.05 ppm to about 10 ppm, and preferably from about 0.1 ppm to about 5 ppm.

In a particularly preferred manner of operation according to the present invention, extremely low levels of initiator and activator compound are employed to thereby produce a polymer having substantially improved clarity and color properties. In particular, the yellowness index of a polymer according to the present invention as measured according to ASTM D-1925 is less than about 4.0, and preferably less than about 3.0.

When formed into a polymeric optical fiber by a suitable technique, such as melt pulling or pulltrusion of a preform or casting of the alpha-methylstyrene polymer in a poly(methyl methacrylate) jacket, or coextrusion of an alpha-methylstyrene core cladding resin jacket, the fiber preferably has a light attenuation of 1000 decibels/kilometer (Db/km) or less at frequencies of 300–900 nanometers (nm). In making such measurements, the technique employed is that of R. G. Brown and B. N. Derick, *J. App. Optics*, V. 7, 1565 (1968).

Organic diluents suitably employed in the present polymerization process are preferably aliphatic or aromatic solvents such as cyclohexane, toluene or ethylbenzene. In a preferred embodiment of the invention, excess alpha-methylstyrene monomer may be employed as a diluent thereby eliminating the need for the presence of additional organic diluents. Initiator, initiator activator and terminator are all generally employed as dilute solutions in an inert solvent such as the above diluents.

The reaction is conducted at a temperature above about 61° C., the ceiling temperature of alpha-methylstyrene. At such temperatures it has now been found that a unique polymer structure is formed wherein no more than two adjacent alpha-methylstyrene polymer moieties are present. The polymer is thereby characterized by the presence of at least some "triads" made up of the polymerized sequence of alpha-methylstyrene/vinylaromatic/alpha-methylstyrene moieties. At higher alpha-methylstyrene contents larger numbers of such triads are observed. The highest alpha-methylstyrene content is therefore limited to about ⅔ of the entire polymer or about 66.6 percent on a molar basis. Maximum operating temperatures of the polymerization are determined by considerations of safety and convenience. Suitably a maximum temperature of about 150° C. is employed.

The polymerization reaction is terminated by contacting with a terminator according to known techniques. Suitable terminators are organic compounds containing reactive hydrogens, especially alcohols or carboxylic acids. Recovery of polymer is normally readily obtained by exposing the terminated polymer solution to reduced pressure optionally at elevated temperatures (devolatilization). Termination results in the formation of lithium compounds which remain in the finished polymer. When analyzed for lithium metal content (expressed as lithium ions), the polymers of the invention preferably contain less than about 10 ppm lithium.

In order to avoid further contamination of the highly pure polymer prepared by the present process, it is further desirable to reduce subsequent handling, packaging, and reheating of the polymer. Accordingly, in a particular preferred embodiment of the present invention, exemplified in FIG. 1, there is provided an apparatus adapted to continuously prepare optical devices such as fiber optic cable or preforms suitable for converting into fiber optic cable by pulltrusion, melt drawing or other suitable technique, or alternatively, pelletized polymer for molding or other uses. Advantageously, by permitting direct extrusion or casting of the optical fiber or preform, contamination of the polymer and degradation of the optical properties of the polymer are greatly reduced.

In the apparatus, a stirred reactor 1 is adapted to receive organolithium initiator in a solvent solution through valve 6 and line 7 from a supply 8. Monomer mixture comprising a recycle stream of unreacted monomers, organic diluent, and initiator; purified vinylaromatic and alpha-methylstyrene monomers; and optional diluent is supplied through line 10, mixer 11, line 12, and valve 17 to the reactor. Initiator activator solution dissolved in an organic solvent is supplied from tank 18 via line 19 and valve 20 to the reactor by means of line 12 and valve 17. The reactor is in operative communication with discharge means 2 connected via line 21 to a mixer 24 adapted to receive terminator from tank 23 via line 22 also connected to line 21. Terminated polymerization mixture is discharged from mixer 24 via line 25 to devolatilizer 26. The devolatilizer 26 separates unreacted monomer and diluent for recycle and is in operative communication with discharge means 27 which is connected to valve 28 to alternatively supply finished, highly pure, alpha-methylstyrene polymer to either a pelletilizing means 29; a coextrusion means 30, fitted with a diblock extrusion head 31 for the preparation of finished optical fibers 33, having a core of the alpha-methylstyrene copolymer of the present invention and a cladding comprising a suitable cladding polymer such as polymethylmethacrylate, supplied via line 32; or a casting means 34, for the casting of finished preforms comprising a cylindrical outer cladding of a suitable polymer 35, inside of which the alpha-methylstyrene polymer of the present invention is cast.

Associated pumping means 9, 35 and 36 are provided to supply initiator solution, initiator activator solution or termination solution as required. Discharge means 2 and 27 typically are gear pumps or other suitable positive displacement pumping means. The reactor 1 may typically comprise a jacket 3, designed to receive heat transfer fluid (not depicted) and is also equipped with a stirring means such as an impeller 5 and associated drive mechanism 4.

Having described the invention, the following examples are provided as further illustrative and are not to be construed as limiting. Where provided, all parts and percentages are expressed as parts and percentages by weight.

EXAMPLE 1

A polymerization mixture comprising 28 percent styrene, 20 percent alpha-methylstyrene and 52 percent ethylbenzene is prepared. The styrene monomer is hydrogenated to remove phenylacetylene and the polymerization mixture is purified by flash vacuum distillation followed by filtering through an activated alumina bed. The polymerization mixture is then mixed with a solution of potassium tertiary-amyloxide in purified cyclohexane solvent, so as to provide a level of potassium tertiary-amyloxide of about 1.0 parts per million in the mixture.

The polymerization mixture is then introduced into a stainless steel and glass reactor equipped with an agitator (continuous stirred reactor). The reactor and contents are heated under nitrogen atmosphere at 100° C. and a reduced pressure of approximately 250 mm mercury. A 2 percent solution of n-butyllithium in purified cyclohexane is continuously added to the reactor at a rate so as to provide about 25 parts per million initiator based on total monomer weight.

The resulting polymer solution is continuously removed from the reactor and subjected to termination with methanol solution in order to destroy the active poly(alpha-methylstyryl) anion. The polymer solution is then devolatilized under vacuum and pumped directly to a water cooled pelletizer. Alternatively, a valve allows the finished polymer to be fed directly to an extruder to be coextruded directly into fiber optic cable comprising a core of the alpha-methylstyrene polymer of the invention and a coextruded cladding of polymethylmethacrylate. The molecular weight of the copolymer is about 160,000 as measured by gel permeation chromatography. The yellowness index as measured by the technique of ASTM D-1925 is 2.9. Total content of lithium in the polymer measured as lithium ion is less than 10 ppm.

What is claimed is:

1. A process for preparing an alpha-methylstyrene polymer comprising contacting a monomer mixture consisting essentially of alpha-methyl-styrene and at least one copolymerizable vinyl aromatic comonomer with an effective amount to cause anionic polymerization of an organolithium initiator and an initiator activator which is a sodium-, potassium-, rubidium-, or cessium-derivative of an oxygen-, sulfur-, or nitrogen-containing organic compound at a temperature above about 61° C., and recovering the alpha-methylstyrene polymer.

2. A process according to claim 1, wherein an organic diluent is additionally present.

3. A process according to claim 1, wherein the copolymerizably vinyl aromatic comonomer is styrene.

4. A process according to claim 1, wherein the organolithium initiator is an alkyllithium having up to about 20 carbons.

5. A process according to claim 1, wherein the organolithium initiator is n-butyllithium.

6. A process according to claim 1, wherein the initiator activator is a sodium, potassium, rubidium or cesium alkoxide.

7. A process according to claim 1, wherein the initiator activator is potassium tertiary-amyloxide.

8. A process according to claim 1, wherein the organolithium initiator is present in an amount based on final polymer weight from about 1 ppm to about 100 ppm.

9. A process according to claim 1, wherein the alpha-methylstyrene polymer has a yellowness index as measured according to ASTM D-1925 of 4.0 or less.

10. A process according to claim 9, wherein the alpha-methylstyrene polymer has a yellowness index as measured according to ASTM D-1925 of 3.0 or less.

* * * * *

UNITED STATES PATENT AND TRADEMARK OFFICE
CERTIFICATE OF CORRECTION

PATENT NO. : 4,748,222
DATED : May 31, 1988
INVENTOR(S) : Michael T. Malanga

It is certified that error appears in the above-identified patent and that said Letters Patent is hereby corrected as shown below:

Column 4, line 16, "2-butanethiol," should read --1-butanethiol,--.

Column 4, line 29, "4,4'methyl-" should read --4,4'-methyl- --.

Column 4, line 45, "linolenic" should read --linoleic--.

Column 7, line 41, "mix!ure oomprising" should read --mixture comprising--.

Column 8, line 23, "alpha-methyl-styrene" should read --alpha-methylstyrene--.

Column 8, line 27, "cessi-" should read --cesi- --.

Column 8, line 35, "lymerizably" should read -- lymerizable --.

Signed and Sealed this

Twenty-third Day of May, 1989

*Attest:*

DONALD J. QUIGG

*Attesting Officer*   Commissioner of Patents and Trademarks